July 30, 1957 E. W. PIERCE 2,801,384
SPARK PLUG TESTING APPARATUS
Filed March 27, 1953 3 Sheets-Sheet 1

INVENTOR
Earl W. Pierce
BY Lewis D. Burch
ATTORNEY

July 30, 1957  E. W. PIERCE  2,801,384
SPARK PLUG TESTING APPARATUS

Filed March 27, 1953  3 Sheets-Sheet 3

INVENTOR
Earl W. Pierce
BY Lewis D. Beach
ATTORNEY

United States Patent Office 2,801,384
Patented July 30, 1957

2,801,384

SPARK PLUG TESTING APPARATUS

Earl W. Pierce, Flint, Mich., assignor to General Motors Corporation, Detroit, Mich., a corporation of Delaware Application March 27, 1953, Serial No. 344,961

14 Claims. (Cl. 324—15)

This invention relates to spark plug testers, and, more particularly, to testers of the dual spark plug comparison variety commonly employed in service stations and repair garages.

In such apparatus a used or test plug and a new or reference plug are mounted in one or more pressurized chambers through which the spark produced between the "points" at the bottom or gap end of each plug may be viewed. The test plug is compared against the reference plug by connecting each plug in succession at its top terminal electrode or contact end to a high tension electrical source, increasing the pressure surrounding the gap end of each plug and comparing the pressure at which the spark produced by each plug is brightest.

The present invention has among its objects to effect improvements in the design, construction and operation of spark plug testers of the aforementioned and related variety, notably from the standpoint of simplifying the construction of various components employed therein, facilitating quick electrical changeover from one spark plug to another and enabling safe, accurate and reliable visual observations and comparisons to be made rapidly and most conveniently.

In accordance with the invention there is provided a quick-change connector arm in the form of a two-way selector switch which is mounted for rotation on an axis inclined to the axes of the spark plug so as to make a drop contact with the top terminal contact of either spark plug. Among the advantages presented by the connector arm of the present invention over connector arms of the sliding contact variety employed in prior art forms of related testing devices, are its simplicity of construction and mechanical operation and its longer serviceability.

The spark plugs are mounted in a bomb casting having a bomb chamber portion and viewing well, the bomb chamber portion of which has defined therein a pair of firing or pressure chambers and a number of inter-connecting air passages that are so arranged as to avoid the use of core plugs in the casting, thereby eliminating possible leakage sources and reducing manufacturing costs. The firing chambers are so formed as to receive the spark plugs with their axes inclined relative to each other, and there is further featured a novel optical reflecting and viewing system, in combination therewith, which reduces the separation between the spark images produced by the plugs and, therefore, the field of view of the spark images and permits viewing thereof through the viewing well without the necessity of the observer to shift his head or field of view, thereby affording reliable and accurate observations to be made with greater convenience than with prior art testing devices.

The above and other objects, features and advantages of the invention will appear more fully from the following detailed description and drawings, wherein.

Figure 1:
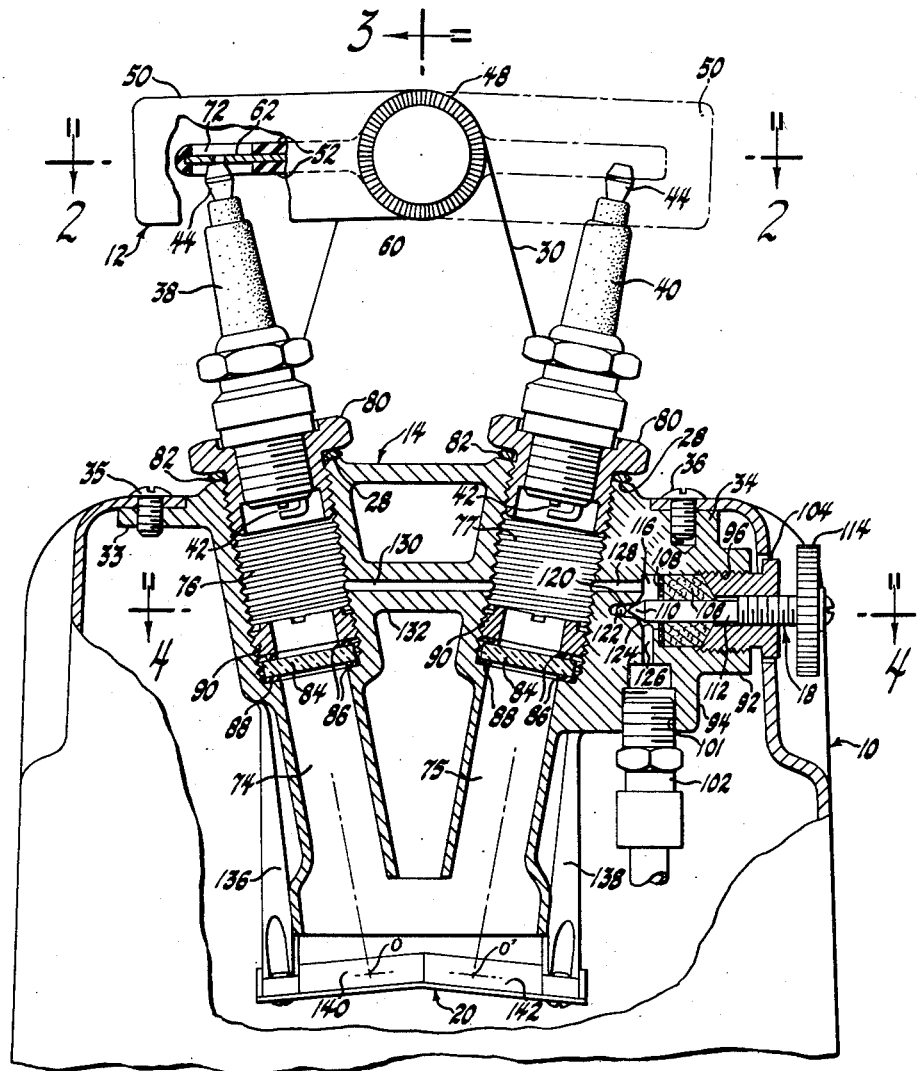
Fig. 1 is a fragmentary front elevation view with parts broken away and in section illustrating a spark plug testing apparatus in accordance with the present invention.
Figure 2:
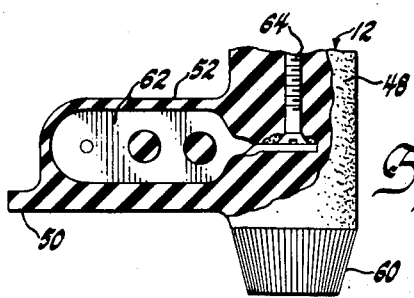
Fig. 2 is a fragmentary view with parts broken away and in section of the connector arm of the invention taken substantially in the direction 2—2 of Fig. 1.
Figure 3:
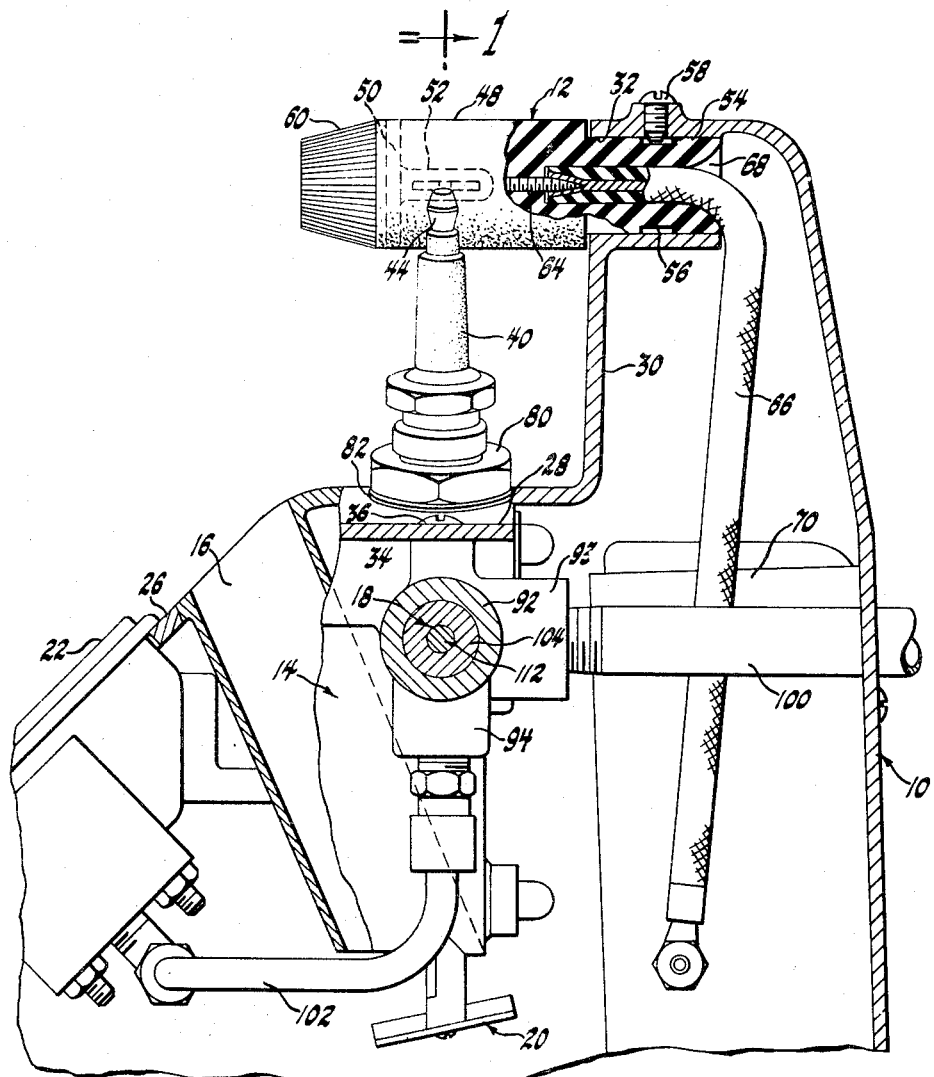
Fig. 3 is a fragmentary side elevation view with parts broken away and in section of the test apparatus taken substantially in the direction 3—3 of Fig. 1.

Referring to Figs. 1 and 3 of the drawings, the test apparatus comprises, in general, a cabinet housing 10, a connector arm 12, a bomb casting 14 having an inclined indirect viewing well 16 associated therewith, a regulating valve assembly 18, a compound reflecting mirror 20 and a pressure gage 22.

The cabinet housing 10 is a walled structure, preferably of cast aluminum construction, and includes, as viewed in side elevation, an inclined forward portion 26, a slightly upwardly inclined top central portion 28 and an upstanding rear portion 30 having a walled opening 32 extending therein. The walled cabinet portions 26 and 28 have a rectangular opening therein which receives the bomb casting 14 and its viewing well 16 the outer end of the latter being located in the inclined forward portion 26 of the housing 10 just above the pressure gage 22, substantially as shown. The bomb casting 14 has an ear 33 and a small vertically extending projection or boss 34 integrally formed at the respective sides of the bomb chamber portion thereof, which is located immediately behind the inclined viewing well, and is supported from and is detachably secured to the cabinet portion 28, as by the screws 35, 36 threadably received in the ear 33 and boss 34, respectively. The bomb chamber portion mounts a new or comparison spark plug 38 and a used or test spark plug 40 the axes of which are contained in a vertical plane through the vertically extending bomb chamber portion of the casting 14. The plugs are received in the top of the casting 14 by their bottom or spark gap end 42, the opposite end of each plug being provided with an axial central top terminal electrode or contact, as 44, which is adapted to be connected to a high-tension electrical source through the two-way selector switch or connecting arm 12 of the present invention.

The connector arm 12 may be molded from suitable electrical insulating material, such as Tennite, and has a cylindrical body portion 48, a flat shield or guard portion 50 and a flat vane or flap portion 52, normal to the shield portion 50. The inner end 54 of the connector arm body portion is of reduced diameter and is received in the walled opening 32 at the top of the cabinet housing, the walls of the opening providing a support and a bearing surface therefor. The reduced inner end 54 of the arm is grooved as shown at 56 to receive a set screw 58 whereby the arm is retained in the cabinet housing. The outer end of the body portion of the connector arm is tapered and knurled to provide a knob 60 by means of which the arm may be rotated readily about its horizontally disposed axis between the position shown in full and dotted outline in Fig. 1. The vane or flap portion 52 extends radially from the body of the arm in an axial plane thereof and has a conducting contactor lug 62 therein, the inner end of which is soldered tto the head of an axial central screw 64 in the body of the arm. The tip of the connecting screw 64 is connected to one end of a high-tension electrical cable 66, which is inserted through a flared central opening 68 extending into the body of the arm. The other end of the cable 66 is connected to the high potential side of the secondary winding of a high-tension transformer 70 that is contained in an electrical circuit energized from an A. C. outlet source. The flap or vane portion 52 of the connector arm is apertured near its outer end as shown at 72 in Fig. 1, with the contactor lug 62 extending transversely therethrough, whereby the contactor lug contacts and may rest with part of the weight of the arm on the top terminal electrode 44 of either spark plug depending upon the position of the connecting arm.

The shield or guard portion 50, which is located immediately behind the knob end 60 and before the vane or flap portion 52 of the connector arm, extends outwardly from the cylindrical body portion 48 in a plane transverse to the axis thereof and protects the operator from accidental contact with the high-tension voltage on the contactor lug or spark plug terminal when the machine is in operation.

It will be noted that the connector arm is mounted on an axis that is inclined to the axes of the spark plugs and makes a drop contact without sliding or frictional engagement with the terminal electrode or contact end of either spark plug. The connector arm thus may be changed quickly from one plug to the other upon a slight rotation of the knurled knob portion thereof, and is subject to less wear and affords greater serviceability than sliding contact type connectors employed heretofore.

The bomb chamber portion of the casting 14 has a pair of bores 74, 75 extending therethrough with their axes in a vertical plane and inclined at a slight angle relative to each other. The upper portion of each bore is of slightly greater internal diameter than the lower portion thereof and forms a cylindrical wall for a respective one of a pair of firing or pressure chambers 76, 77 defined in the bomb chamber portion of the bomb casting 14. The upper end of each bore is internally threaded to receive a spark plug adaptor 80 for the particular size of plug being tested, a set of different sized adaptors being furnished with each testing unit. A steel sealing gasket 82 is provided between the adaptor 80 and the top of the bomb casting to prevent leakage of air when the plugs are installed therein by their bottom or spark gap end 42 which forms the outer end wall for the firing chamber with which each plug is associated. The lower end wall of each firing chamber is formed by a transparent closure member in the form of a glass window 84 that has a pair of rubber sealing gaskets 86 on the opposite sides thereof and is secured on a shoulder 88, which is formed in each bore between the upper and lower portions thereof, by a hollow gland screw 90, substantially as shown.

The bomb chamber portion of the bomb casting 14 has a number of integrally formed projections or bosses 92, 93 and 94 at one side thereof mutually disposed at right angles to each other and located adjacent one of the firing chambers 77, as shown in Figs. 1 and 3. The laterally extending horizontal boss 92 has a threaded opening 96 therein, the axis of which preferably lies in the plane of the axes of the firing chambers, and receives the regulating valve assembly 18 of Fig. 1. The boss 93 extends horizontally and rearwardly from the bomb chamber portion of the casting 14 and has a threaded opening 98 therein normal to the opening 96 to receive a pipe nipple 100, which extends through the rear wall of the cabinet housing and is connected to a suitable pressure air line. The lower boss 94 extends vertically downwardly and has a threaded opening 101 therein which receives the threaded end of a pressure gage line 102 the other end of which is connected to the pressure gage 22, as shown in Fig. 1.

Figure 4:
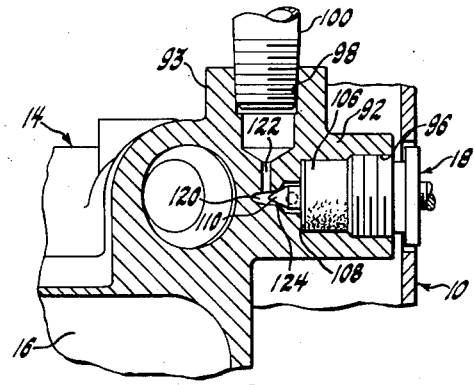
Fig. 4 is a sectioned view of a part of the bomb chamber casting of the invention taken substantially in the direction 4—4 of Fig. 1.

The regulating valve assembly 18 comprises a centrally apertured plug 104, which forms the body of the valve and is threaded into the opening 96, a packing gland such as a graphite impregnated leather washer 106, a centrally apertured plate 108 and a needle valve 110 having a partially threaded stem portion 112, which extends through the parts 104, 106 and 108, and an adjusting knob 114 at the outer end of the stem for adjusting the position of the valve. The end of the plate 108 is spaced from the inner end wall of the opening 96 so as to form a pressure application chamber 116 therein, which communicates with the pressure inlet opening 98 in the rear boss 93 through a pressure regulating passage 120 and a pressure supply passage 122, as shown in Figs. 1 and 4. The pressure regulating passage 120 provides a valve seat 124 at its end opening into the pressure application chamber for the needle valve 110 and extends a short distance into the wall of the bomb chamber casting 14 in the direction of the opening 96 therein.

The pressure inlet passage 122 in the rear boss 93 is inclined at right angles to and communicates with the pressure regulating passage 120, whereby air may be supplied from the pressure air line to the chamber 116. A passage 126 is provided between the pressure application chamber 116 and the opening 101 in boss 94 through which air is supplied through the line 102 to the pressure gage 22. Air is supplied from the application chamber 116 to the firing chamber 77 through a pressure supply passage 128, which is located immediately above the pressure regulating passage 128, and a pressure balancing or inter-connecting passage 130 coaxially disposed or aligned with the pressure supply passage 128 is formed in a web 132 between the firing chambers whereby air may be supplied from the firing chamber 77 to the chamber 76.

The particular arrangement of the passages and openings in the bomb chamber casting reduces the number of machining operations required for the formation thereof with consequent reduction in manufacturing costs and eliminates the use of core plugs, as are employed in prior art structures of this character. There is thus provided a less expensive and more efficient structure in which possible leakage sources have been minimized. In as much as the regulating valve assembly is not directly connected in or associated with the pressure inlet line 100, leakage past the regulating valve assembly is eliminated as there is no pressure on the packing gland 106 of the valve assembly when the needle 110 is closed.

The viewing well 16, which may be of separate formation or integrally formed in the forward portion of the bomb casing 40, is open at its ends and is of an elongated or generally oval-shaped cross section. External illumination is excluded from the interior of the cabinet housing by the extended inclined walls of the viewing well, which may be covered with black paint to eliminate extraneous reflections from within or without the cabinet housing.

Figure 6:
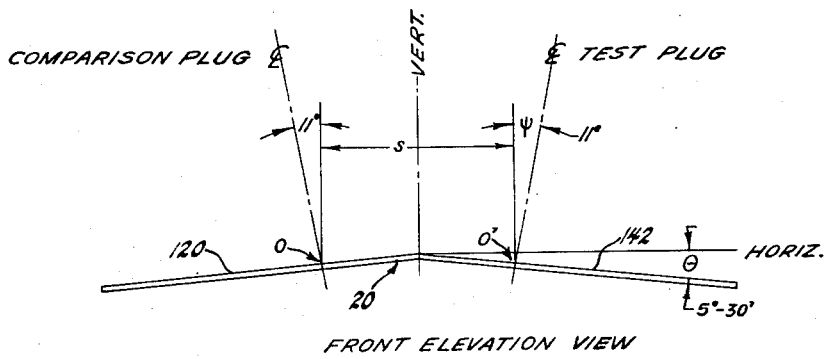

The mirror 20 of the optical viewing and reflecting system of the invention is located within the cabinet housing to form a pair of spark images at the points O and O', where the axis of the spark plugs intersect the axial plane of the viewing well and is mounted on a pair of legs 136, 138 on the bomb chamber casting, as shown in Fig. 1. The mirror may be of an inverted generally V-shaped formation providing a pair of oppositely inclined planular surfaces 140, 142 each of which makes an angle $\theta$ (theta) with a horizontal line passing through the apex thereof that is equal to one-half the angle $\psi$ (psi) subtended between the center-line of a spark plug and the vertical, whereby the spark images will be reflected therefrom in parallel beams lying in the same plane, as shown in Fig. 6.

Figure 5:
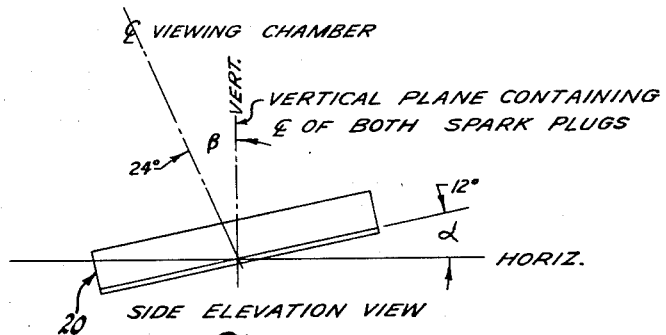
Figs. 5 and 6 are side and front elevation views, respectively, diagrammatically illustrating certain principles involved in the design of the optical system of the present invention.

In order to permit viewing of the spark images from the inclined viewing well, the mirror is inclined forwardly, as shown in the side elevation diagrammatic view of Fig. 5, to make an angle $\alpha$ (alpha) with a horizontal plane equal to one-half of the angle $\beta$ (beta) between the vertical plane containing the spark plug axes and the axis of the viewing well.

In the specific embodiment of the invention illustrated herein, the axes of the spark plugs are inclined at an angle of 22° to each other, whereby the planular reflecting surfaces of the compound mirror will be oppositely inclined to the horizontal at an angle $\theta$ of 5°—30'. The angle between the plane of the spark plugs and the axis of the viewing well is 24° so that the angle $\alpha$ of Fig. 5 will be 12°.

The distance $s$ (Fig. 6) between the spark images is a function of the angle included between the axes of the spark plugs and the distance from the "points" 42 at the gap end of each plug to the mirror therebelow.

Since the spark plugs are mounted with their axes inclined to each other, the spark images produced thereby will appear close together on the reflecting mirror at the bottom of the viewing well, and by reason of the rapid changeover afforded by the connector arm from one plug to the other, the spark images, viewed in quick succession, will appear in a generally similar location, whereby rapid, accurate and convenient visual observations may be made thereof. The exclusion of external illumination and extraneous reflections from the interior of the cabinet housing by the reason of the construction of the hooded indirect viewing well permits accurate comparison of the pressure at which the spark produced by each plug is brightest and the arrangement and construction of the novel optical viewing system of the invention, whereby the spark images are presented in a single or reduced field of vision, enables observation thereof with convenience and without viewing discomfort that is experienced with prior art testing devices, where the observer must shift his head and field of vision during such testing.

What is claimed is:

1. In a spark plug tester the combination of a walled housing having a pair of firing chambers therein, each of said chambers receiving one end of a spark plug and having a transparent closure positioned therein to permit viewing of the said end of a plug therethrough, a viewing well in said housing and a mirror positioned in said housing to provide a reflecting surface for viewing said spark plugs through said viewing well, the axes of said firing chambers being inclined to one another and converging in the direction of said mirror.

2. In a spark plug tester the combination of a walled housing having a pair of firing chambers therein axially inclined to one another, each of said chambers being adapted to receive one end of a spark plug and having a transparent closure positioned therein to permit viewing of the said end of a plug therethrough, a viewing well in said housing and an optical reflecting system positioned in said housing in the axial path of said firing chambers and said viewing well, said optical reflecting system including oppositely inclined reflecting surfaces reducing the field of view of the images of said spark plugs through the viewing well so that the distance between the spark images projected on said reflecting surfaces as viewed through said well is less than the distance between the ends of the plugs producing the images.

3. In a spark plug tester the combination of a walled housing having a pair of firing chambers therein axially inclined to one another, each of said chambers being adapted to receive one end of a spark plug and having a transparent closure positioned therein to permit viewing of the said end of a plug therethrough, a viewing well in said housing inclined to the plane containing the axes of said firing chambers and a V-shaped mirror positioned in said housing in the axial path of said firing chambers and said viewing well reducing the field of view of the images of said spark plugs through the viewing well in relation to that otherwise produced by a simple planular mirror.

4. In a spark plug tester the combination of a walled housing having a pair of firing chambers therein axially inclined to one another, each of said chambers receiving one end of a spark plug and having a transparent closure positioned therein to permit viewing of the said end of a said plug therethrough, a viewing well in said housing and an inverted V-shaped mirror positioned in said housing in the path of said firing chambers and said viewing well for viewing said spark plugs through said viewing well, said mirror providing a pair of oppositely inclined reflecting surfaces each forming with the axis of a respective one of said firing chambers an incident angle substantially equal to one half of the supplement of one-half of the angle included between the said axes of said firing chambers.

5. In a spark plug tester the combination of a walled housing having a pair of firing chambers therein axially inclined to one another, each of said chambers receiving one end of a spark plug and having a transparent closure positioned therein to permit viewing of the said end of a said plug therethrough, a viewing well in said housing and an inverted V-shaped mirror positioned in said housing in the path of said firing chambers and said viewing well for viewing said spark plugs through said viewing well, said mirror providing a pair of oppositely inclined reflecting surfaces each forming with a horizontal line passing through the apex of said mirror an angle substantially equal to one-half the angle between the axis of a firing chamber and the vertical.

6. In a spark plug testing apparatus the combination of a walled housing having a pair of firing chambers therein axially inclined to one another, each of said chambers receiving one end of a respective one of said spark plugs and having a transparent closure in a wall thereof for viewing the said end of a said spark plug therethrough, said housing having a viewing well extending therein inclined to the plane of the axes of said firing chambers, and a compound mirror providing a pair of reflecting surfaces each equally inclined to the axis of a respective chamber, said mirror being further inclined to the said plane of the axes of said firing chambers to permit viewing of said spark plugs through said viewing well.

7. In a spark plug testing apparatus the combination of a walled housing having a pair of firing chambers therein axially inclined to one another, each of said chambers axially receiving one end of a spark plug and having a transparent closure in a wall thereof for viewing the said end of a spark plug therethrough, said housing having a viewing well extending therein in a plane inclined to a plane containing the axes of said plugs, and a compound mirror in said housing having a pair of reflecting surfaces, said mirror being inclined to the said plane containing the axes of said spark plugs in amount equal to the inclination of said mirror to the said plane of said viewing well.

8. In a spark plug testing apparatus the combination of a walled housing having a pair of firing chambers therein axially inclined to one another, each of said chambers axially receiving one end of a spark plug and having a transparent closure in a wall thereof for viewing the said end of spark plug therethrough, said housing having a viewing well extending therein in a plane inclined to a plane containing the axes of said spark plugs and a mirror inclined to the said plane of the axes of said spark plugs and the said plane of said viewing well to permit viewing of said spark plugs through said viewing well, said mirror providing a pair of oppositely inclined reflecting surfaces each forming with the axis of a respective one of said plugs an angle equal to the opposite angle formed by that surface of the mirror with a vertically extending plane through the mirror.

9. In a spark plug testing apparatus the combination of a walled housing having a pair of firing chambers therein axially inclined to one another, each of said chambers axially receiving one end of a spark plug and having a transparent closure in a wall thereof positioned to permit viewing of the said end of a spark plug therethrough, said housing having a viewing well extending therein in a plane inclined to a plane containing the axes of said spark plugs and a mirror inclined to the said plane of the axes of said spark plugs and the said plane of said viewing well so that the angle formed between the mirror and the said plane of said spark plugs is equal to the opposite angle formed between the mirror and the said plane of said viewing well, said mirror providing a pair of oppositely inclined reflecting surfaces each forming with the axis of a respective one of said plugs an angle equal to the opposite angle formed by that surface of the mirror with a vertically extending plane to the mirror.

10. In a spark plug testing apparatus for comparing a pair of spark plugs each having a terminal contact adapted to be energized from a high-tension electrical source, said apparatus comprising, in combination, a walled housing mounting said spark plugs with their axes inclined to each other and in a plane containing the axes of said plugs, a high-tension electrical source, a two-way contactor electrically connected with said source and rotatably mounted in said housing between said plugs on an axis normal to the said plane containing the axes of said plugs, said housing having optical reflecting and viewing means therein including a compound mirror having a pair of reflecting surfaces inclined to the axes of said spark plugs and reducing the field of view thereof.

11. In a spark plug testing apparatus for comparing a pair of spark plugs each having an axial terminal contact adapted to be energized from a high-tension electrical source, said apparatus comprising, in combination, a walled housing having a pair of firing chambers therein having their axes inclined to one another and contained in a common plane, each of said chambers axially receiving one end of a respective one of said plugs, a high-tension electrical source, a two-way contactor electrically connected with said source and rotatably mounted in said housing between said spark plugs on an axis normal to the said plane containing the axes of said plugs, a transparent closure in the walls of each of said firing chambers to permit viewing the said end of a spark plug therethrough, a viewing well in said housing inclined to the said plane containing the axes of said spark plugs, and a mirror positioned within said housing and providing a pair of reflecting surfaces each inclined to the axis of a respective one of said firing chambers, said mirror further being inclined to the said plane containing the axes of said firing chambers and to the axial plane of said viewing well to permit viewing of said spark plugs from the viewing well.

12. In a spark plug testing apparatus for comparing a pair of spark plugs each having an axial terminal contact adapted to be energized from a high-tension electrical source, said apparatus comprising a housing receiving the spark terminal end of each of said plugs and supporting said plugs with their axial terminal contacts extending in one general direction and in spaced side-by-side relation, a two-way contactor adapted to be connected with said source and pivotally mounted on an axis extending between and transverse to the axes of said plugs, and the arrangement being such that a single arcuate movement of said contactor about said axis may switch it from one plug to the other.

13. In a spark plug tester as set forth in claim 12 including a pair of oppositely inclined reflecting surfaces, each of said surfaces lying transverse to the axis of one of said plugs, and the distance between images of said plugs formed on said surfaces being less than the distance between said plugs.

14. In a spark plug testing apparatus for comparing a pair of spark plugs each having a terminal contact, said apparatus comprising a housing mounting said plugs with their axes substantially vertical, a two-way contactor including a connector arm with one end pivotally supported for rotation around a substantially horizontal axis extending between said plug axes, means for conducting current along said horizontal axis to said connector arm, stop means associated with said contactor preventing any substantial movement of the latter in either direction along said horizontal axis, and said connector arm having opposed contactor surfaces arranged to contact the terminal contacts of said plugs alternately when said contactor is manually oscillated about said horizontal axis.

References Cited in the file of this patent
UNITED STATES PATENTS

| | | |
|---|---|---|
| 1,380,947 | Christopher | June 7, 1921 |
| 1,517,037 | Watkins | Nov. 25, 1924 |
| 1,639,603 | Gowland | Aug. 16, 1927 |
| 1,836,391 | Price | Dec. 15, 1931 |
| 2,505,422 | Michaels | Apr. 25, 1950 |